Patented May 30, 1939

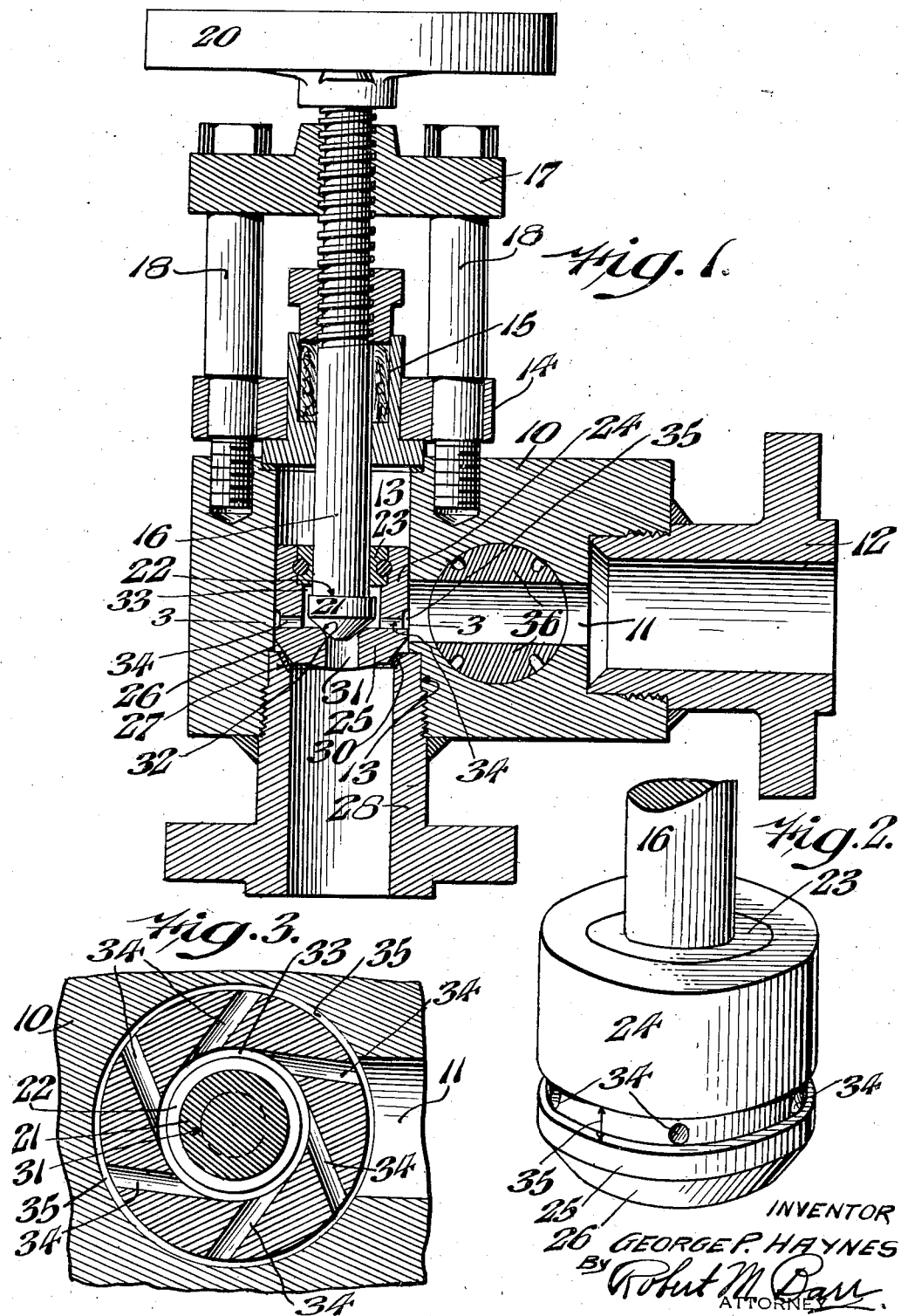

2,160,657

UNITED STATES PATENT OFFICE 2,160,657

VALVE FOR CONTROL OF MEDIUMS UNDER PRESSURE

George P. Haynes, Rockville Centre, N. Y.

Application December 18, 1937, Serial No. 180,488

2 Claims. (Cl. 277—36)

The present invention relates to valves and more particularly to valves subjected to high pressures, such for example as that to which steam blow-off valves are subjected.

Some of the objects of the present invention are to provide an improved valve of the reciprocally operated type; to provide a valve which can be readily and easily opened when under pressure; to provide a simple and effective valve wherein provision is made to so balance pressures as to make the operation of the valve extremely easy under operating conditions; to provide a valve wherein the pressure of the discharging water or other medium is utilized to assist in the opening of the valve; to provide a valve wherein the relative position of the valve closure member to its seat is automatically varied to prevent the closure member from corroding and becoming fixed in one position; to provide valve means wherein the valve seat is automatically maintained in proper sealing condition; and to provide other improvements as will hereinafter appear.

In the accompanying drawing Fig. 1 represents a side elevation in part section of a blow-off valve equipped with a control valve embodying one form of the present invention; Fig. 2 represents a perspective of the valve of the invention; and Fig. 3 represents a section on line 3—3 of Fig. 1.

Referring to the drawing one form of the present invention is shown as used as the control unit of a blow-off valve of the tandem type. Thus a housing or casing 10 is provided with an inlet passage 11 which communicates with a flange fitting 12 for proper connection to the boiler line. The passage 11 opens also into a discharge conduit 13 at right angles thereto, one end of which leads to the atmosphere or other point of discharge while the other end is closed by a cover plate 14 suitably fastened to the casing 10. Associated with the cover plate 14 is a stuffing box 15 through which the valve stem 16 projects to bring its threaded portion into engagement with a yoke 17 which is held in fixed position by studs 18 threaded into the casing 10. A hand wheel 20 is carried by the stem 16 for operating purposes, so that rotation of the wheel 20 causes the stem 16 to feed linearly in accordance with the direction of rotation of the wheel 20. In the present instance the inner end of the stem 16 terminates in an auxiliary valve 21 in the form of a head of larger diameter than the stem 16 in order to provide a circumferential shoulder 22 which serves to engage a ring member 23 mounted as a part of an annular extension 24 of a main valve 25. The tapered face 26 of the valve 25 is arranged to coact with an annular seat 27 which is provided, in the present instance, on the inner end of a fitting 28 threaded into the discharge conduit 13. A suitable metal insert 30 of wear resisting material may serve as the actual seat for the valve 25, in that it is formed as a lining for the seat 27. In order to permit water and steam under pressure to pass from the inlet passage 11 to the discharge conduit 13 prior to the opening of the main valve 25, the latter is provided with an axially disposed relief port 31 having a seat 32 in its inner end to receive the auxiliary valve 21. Thus it will be seen that the main valve 25 with its extension 24 provides a chamber 33 within which the auxiliary valve 21 is reciprocable to open and close communication between the chamber 33 and the port 31.

For establishing communication between the inlet passage 11 and the chamber 33, the extension 24 is provided with a plurality of channels 34 opening at the outer end in a circumferential groove 35, and at the inner end into the chamber 33. Since the groove 35 is in register with the inlet passage 11 it follows that any medium under pressure in the passage 11 will be conveyed by the channels 34 to the chamber 33 to thereby balance the pressure on the auxiliary valve 21 and make it easier to open. An important feature of the present invention resides in the fact that the channels 34, instead of passing radially through the wall of the extension 24 are all angularly disposed in the same direction with respect to such radial line or lines. This angularity is arranged so that one wall of each channel is always so positioned as to intercept the incoming stream of steam or water under pressure and the result is the force creates a torque tending to rotate or turn the main valve about its axis, because the valve 25 is free to move relative to the stem 16. This action tends to break any corrosive sticking of the valve 25 to its seat 32 and materially reduces the force necessary to lift the valve 25 from its seat 32 when a full blow-off is required. As a practical result the rotative action of the valve 25 not only assists in the opening of the valve when necessary but also wipes the seat, closely approximating a grinding action, so that freezing of the valve in closed position becomes impossible.

It will now be apparent that a complete unitary valve construction has been devised which is particularly efficient for use as a blow-off valve for steam boilers or any other place where a medium under pressure has to be controlled. It should be noted that the number and spacing of the channels 34 is such that in any stationary position of the valve, at least one of these channels 34 is in the direct path of the steam or other medium traversing the inlet passage 11. In the construction shown this stationary or rest position is determined by whether or not the rotary valve 36, which controls the passage 11, is in closed position. In a valve of this character the normal position of the valve 36 is to close the passage 11, thereby with the valve 25, ensuring a complete shut-off of the boiler from the atmosphere. When the boiler is to be blown-off or some of its contents discharged, the valve 36 is turned to its open position to admit pressure to the channels 34 and the chamber 33 within the main valve 25. The first effect of this pressure action is to exert a torque upon the valve 25 so that it is released from its seat and all possibility of its sticking is eliminated. In this situation the pressure upon the auxiliary valve 21 is balanced so that the stem 16 can be lifted with a minimum of effort to open the auxiliary valve 21 to allow an initial discharge through the port 31 in advance of the opening of the main valve 25.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A valve consisting of a casing having a through passage and a bore communicating with said passage, a valve seat arranged transversely of said passage, a valve stem in said bore to extend exteriorly of said casing, a main valve arranged to engage said seat to close said passage, said valve having an axially disposed port therein, an annular extension in said valve forming an internal chamber, an auxiliary valve in said chamber and attached to said stem, a lost motion connection between said main valve and said stem to afford relative turning of said main valve and a limited linear movement of said stem relative to said valve, and means on said valve responsive to pressure in said passage for causing said valve to turn.

2. A valve consisting of a casing having a through passage and a bore communicating with said passage, a valve seat arranged transversely of said passage, a valve stem in said bore to extend exteriorly of said casing, a main valve arranged to engage said seat to close said passage, said valve having an axially disposed port therein, an annular extension in said valve forming an internal chamber, an auxiliary valve in said chamber and attached to said stem, a lost motion connection between said main valve and said stem to afford relative turning of said main valve and a limited linear movement of said stem relative to said valve, and a plurality of channels through said extension, said channels being disposed at an angle to the direction of the incoming medium under pressure.

GEORGE P. HAYNES.